United States Patent
Dong et al.

(10) Patent No.: US 12,481,923 B2
(45) Date of Patent: Nov. 25, 2025

(54) GRAPHICS PROCESSING UNIT TRAINING JOB ALLOCATION

(71) Applicant: International Business Machines Corporation, Armonk, NY (US)

(72) Inventors: Lin Dong, Beijing (CN); Jun Feng Liu, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 17/934,221

(22) Filed: Sep. 22, 2022

(65) Prior Publication Data

US 2024/0104418 A1   Mar. 28, 2024

(51) Int. Cl.
  *G06N 20/00* (2019.01)
  *G06F 9/50* (2006.01)

(52) U.S. Cl.
  CPC ........... *G06N 20/00* (2019.01); *G06F 9/5027* (2013.01)

(58) Field of Classification Search
  CPC .............................. G06N 20/00; G06F 9/5027
  See application file for complete search history.

(56) References Cited

U.S. PATENT DOCUMENTS

| | | | |
|---|---|---|---|
| 10,884,795 B2 | 1/2021 | Liu et al. | |
| 2003/0158906 A1* | 8/2003 | Hayes | G06F 9/5027 709/211 |
| 2020/0051317 A1* | 2/2020 | Muthler | G06N 5/02 |
| 2021/0124998 A1* | 4/2021 | Jaenisch | G06F 12/0207 |

FOREIGN PATENT DOCUMENTS

| | | | | |
|---|---|---|---|---|
| CN | 106575246 A | * | 4/2017 | .......... G06F 9/5066 |
| CN | 106663224 A | * | 5/2017 | ............. G06N 20/00 |
| CN | 110383296 A | * | 10/2019 | ............... G06T 1/20 |
| CN | 113470179 A | * | 10/2021 | ............. G06T 17/20 |
| CN | 113935886 A | * | 1/2022 | ............. G06N 3/045 |

(Continued)

OTHER PUBLICATIONS

Juncheng Gu et al.; "Tiresias: A GPU Cluster Manager for Distributed Deep Learning", Proceedings of the 16th USENIX Symposium on Networked Systems Design and Implementation (NSDI '19), Feb. 26-28, 2019, 17 pages.

(Continued)

*Primary Examiner* — Hassan Mrabi
(74) *Attorney, Agent, or Firm* — Cantor Colburn LLP; Barak Cohen

(57) ABSTRACT

A computer-implemented method for training a machine learning model includes receiving a first training job at a processing device of a computer system having a plurality of graphics processing unit (GPU) resources, the first training job being part of a set of training jobs, and determining an amount of available memory in each GPU resource of the plurality of GPU resources. The method also includes loading the training job into one or more GPU resources with at least one second training job. The loading includes determining a cost model indicating an efficiency cost of each of a plurality of packing patterns, and packing the first training job and the second training job into the one or more GPU resources according to a packing pattern associated with a lowest efficiency cost.

20 Claims, 7 Drawing Sheets

(56) References Cited

FOREIGN PATENT DOCUMENTS

| | | | | | |
|---|---|---|---|---|---|
| CN | 114078076 A | * | 2/2022 | ............. | G06T 9/001 |
| CN | 117632447 A | * | 3/2024 | ............... | G06T 1/20 |

OTHER PUBLICATIONS

Lui et al.; "Elastic Distributed Training in Watson Machine Learning Accelerator", IBM, Mar. 16, 2020, 8 pages.

Lukas Biewald; "Monitor and Improve GPU Usage for Training Deep Learning Models", Towards data science, Mar. 27, 2019, 10 pages.

Rui Pan, "Salus: Fine-Grained GPU Sharing Primitives for Deep Learning Applications", rui pan's blog, 2020, 1 page.

Wencong Xiao, et al.; "Gandiva: Introspective Cluster Scheduling for Deep Learning", Proceedings of the 13th USENIX Symposium on Operating Systems Design and Implementation (OSDI '18), Oct. 8-10, 2018, 17 pages.

Wencong Xiao, et al; "AntMan: Dynamic Scaling on GPU Clusters for Deep Learning", Proceedings of the 14th USENIX Symposium on Operating Systems Design and Implementation, Nov. 4-6, 2020, 17 pages.

\* cited by examiner

GRAPHICS PROCESSING UNIT TRAINING JOB ALLOCATION

BACKGROUND

The present disclosure relates to training for artificial intelligence and, more particularly, to allocation of training processes for efficient use of graphic processing unit (GPU) resources.

As machine learning applications have been increasing in popularity, more and more resources are utilized for training ML applications. Such training typically utilizes large data sets and is thus resource intensive. Graphics processing units (GPUs) can have massive computing resources and are thus useful for ML training. Effective allocation and distribution of training is desirable to optimize GPU utilization and increase efficiency.

SUMMARY

According to one or more embodiments of the present invention, a computer-implemented method for training a machine learning model includes receiving a first training job at a processing device of a computer system having a plurality of graphics processing unit (GPU) resources, the first training job being part of a set of training jobs, and determining an amount of available memory in each GPU resource of the plurality of GPU resources. The method also includes loading the training job into one or more GPU resources with at least one second training job. The loading includes determining a cost model indicating an efficiency cost of each of a plurality of packing patterns, and packing the first training job and the second training job into the one or more GPU resources according to a packing pattern associated with a lowest efficiency cost.

According to one or more embodiments of the present invention, a system for training a machine learning model includes a processor in communication with a computer system having a plurality of graphics processing unit (GPU) resources. The processor is configured to receive a first training job, the first training job being part of a set of training jobs, determine an amount of available memory in each GPU resource of the plurality of GPU resources, and load the training job into one or more GPU resources with at least one second training job. Loading the training job includes determining a cost model indicating an efficiency cost of each of a plurality of packing patterns, and packing the first training job and the second training job into the one or more GPU resources according to a packing pattern associated with a lowest efficiency cost.

According to one or more embodiments of the present invention, a computer program product for training a machine learning model includes a non-transitory storage medium readable by a processing circuit and storing instructions for execution by the processing circuit for performing a method. The method includes receiving a first training job at a processing device of a computer system having a plurality of graphics processing unit (GPU) resources, the first training job being part of a set of training jobs, determining an amount of available memory in each GPU resource of the plurality of GPU resources, and loading the training job into one or more GPU resources with at least one second training job. Loading the training job includes determining a cost model indicating an efficiency cost of each of a plurality of packing patterns, and packing the first training job and the second training job into the one or more GPU resources according to a packing pattern associated with a lowest efficiency cost.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Devices, methods and systems are described for implementing training models for training of artificial intelligence (AI) or machine learning applications. An embodiment of a method includes receiving one or more training jobs, where each training job includes a respective set of training data for training a machine learning (ML) model, deep learning (DL) or other AI model. In an embodiment, the one or more training jobs are configured for elastic distributed training. The method includes adaptively packing a training job with another training job into one or more overlapping GPU resources (e.g., GPUs and/or GPU partitions or clusters) based on, for example, an efficiency cost model.

Embodiments described herein provide techniques for increasing efficiency and utilization of GPUs. For example, the embodiments adaptively generate packing configurations to maximize utilization of a GPU or GPU resource, and efficiently distribute training problems or jobs among multiple GPUs or GPU resources, thereby reducing costs and energy consumption. Additionally, the present techniques enable applications to leverage portions of multiple, distributed GPUs. Increases in utilization and efficiency are achievable without sacrificing accuracy. These and other advantages will be apparent from the description that follows.

Figure 1:
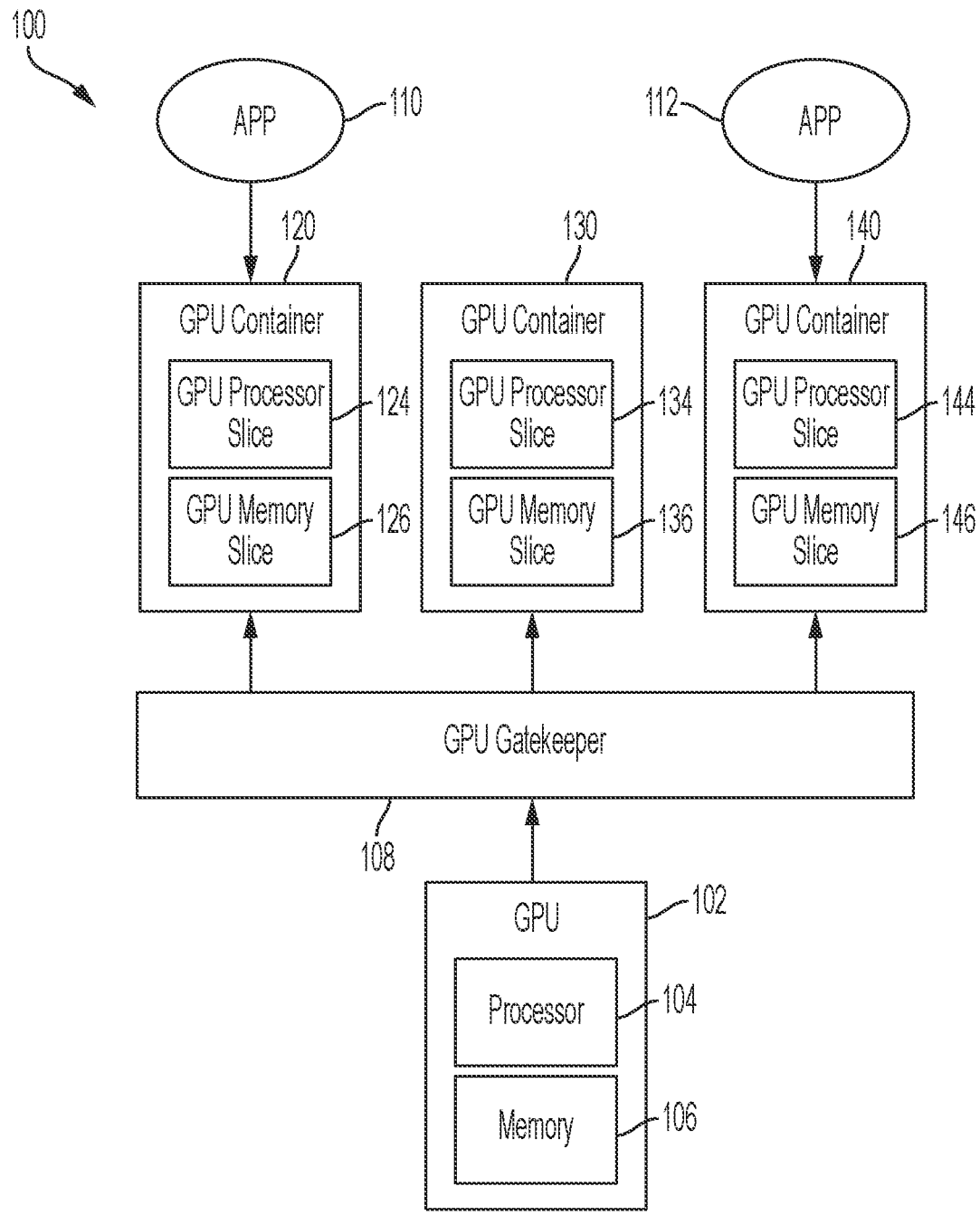
FIG. 1 illustrates a block diagram of a processing system including GPU resources according to examples of the present disclosure.

FIG. 1 illustrates a block diagram of a processing system 100 that includes a plurality of GPU resources. A "GPU resource" may be a GPU, a component of a GPU (e.g., a partition or slice) or any other memory space used by one or more GPUs. The processing system 100 includes, for example a GPU 102 comprising a processor 104 and a memory 106. The processor 104 may be a multi-core processor (e.g., a 4,000 core processor, an 8,000 core processor, etc.). The memory 106 may be a random access memory, for example, that stores instructions that are executable by processor 104. It should be appreciated that, in other examples, additional GPUs may be utilized. Also, a single processing system 100 may have more than one GPU.

The processing system 100 includes a GPU gatekeeper 108, which may be a software module sitting on top of a driver (not shown) of the GPU 102. For example, the GPU gatekeeper 108 may be implemented as a Linux loadable kernel module to extend the driver of the GPU 102. In other examples, the GPU gatekeeper 108 is built as part of the driver of GPU 102. The GPU gatekeeper 108 mediates access to the GPU 102 on the processing system 100 by applications (APP) 110, 112 for sharing the resources of the GPU 102 (including the processor 104 and the memory 106). The GPU gatekeeper 108 also enables sharing of the GPU 102 (or multiple GPUs) along both space and time dimensions. That is, the GPU gatekeeper 108 partitions (i.e., slices) the GPU 102 and its resources (i.e., the processor 104 and the memory 106) by amount of processing power (i.e., number of cores) and amount of memory (i.e., size in bytes). A "slice" is a specific portion of a hardware unit (e.g., 1 core of a processor or 1 byte of memory) of a GPU (e.g., the GPU 102). Slice size may be specified by a fairness policy as discussed below.

In the example of FIG. 1, the processor 104 and the memory 106 of the GPU 102 are partitioned into individual partitions (where each partition may be considered a GPU resource), such as containers 120, 130, 140. The GPU 102 is sliced into GPU processor slices 124, 134, 144 and GPU memory slices 126, 136, 146, respectively contained within the containers 120, 103, 140 (i.e., GPU containers that act similarly to Linux Groups). Applications, such as the applications 110, 112, execute inside the containers 120, 130, 140. In the example of FIG. 1, the GPU processor slice 124 and the GPU memory slice 126 are contained within the GPU container 120, the GPU processor slice 134 and the GPU memory slice 136 are contained within the GPU container 130, and the GPU processor slice 144 and the GPU memory slice 146 are contained within the GPU container 140. The GPU processor slices 124, 134, 144 represent allocated portions of the processor 104, and the GPU memory slices 126, 136, 146 represent allocated portions of the memory 106. Each container 120, 130, 140 can be time-shared among multiple applications (e.g., applications 110, 112), thereby enabling time-based and space-based sharing of the GPU 102.

It is noted that the processing system 100 may include a plurality of GPUs 102 that may be located in the same machine and/or distributed among a plurality of machines connected via a network (e.g., a cloud network). Each GPU 102 may be partitioned as discussed above or partitioned in any suitable manner. Accordingly, a GPU resource may be a local GPU, local GPU partition (e.g., container or slice), a remote GPU and/or a remote GPU partition, and training jobs may be packed and executed as described herein across any combination of GPU resources.

Figure 2:
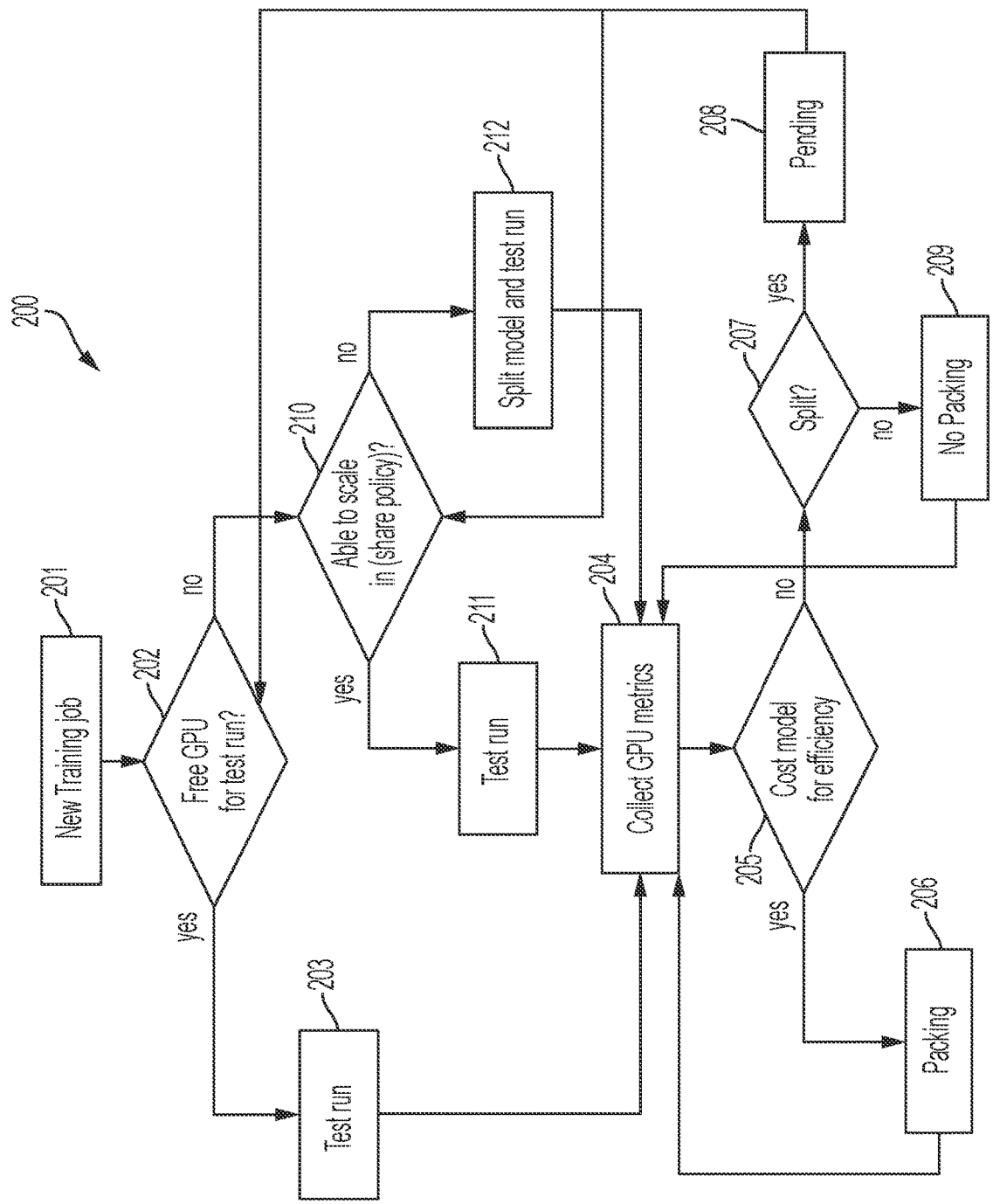
FIG. 2 illustrates a flow diagram of a method of training a machine learning model using GPU resources according to examples of the present disclosure.

FIG. 2 illustrates a flow diagram of a method 200 for executing training jobs across one or more GPU resources. Aspects of the method 200 are discussed as being performed by the processor 104, but may be performed by any suitable processing device or system (e.g., the gatekeeper 108, a remote processor, etc.). In addition, aspects of the method 200 are discussed in conjunction with GPU slices or partitions such as those shown in FIG. 1, but is not so limited and can be performed across any system of GPU resources.

It is further noted that the method 200 is described in conjunction with one received training job for illustration purposes. It is understood that the method or portions thereof may be repeated in real time for any number of received training jobs.

The method 200 includes a number of steps or stages represented by blocks 201-212. The method 200 is not limited to the number or order of steps therein, as some steps represented by blocks 201-212 may be performed in a different order than that described below, or fewer than all of the steps may be performed.

At block 201, the processor 104 receives one or more training jobs. The received training job(s) may be part of a set of training jobs including the received job(s) and any training jobs previously received and/or currently being executed by the GPU resources. For example, the processor 104 receives a first training job (new training job).

At block 202, the processor 104 determines whether there is sufficient resources for executing a test run for the first training job. For example, the processor 104 determines whether any of the GPU partitions or slices 126, 136, 146 have sufficient memory available to run a subset of the training job, referred to as a "test run". A "subset," in an embodiment, includes a selected number of iterations that can be executed to determine a packing schema for packing the first training job across one or more GPU resources and/or packing the first training job (or portion thereof) with one or more other training jobs (or portions thereof) in a single GPU resource or multiple overlapping GPU resources.

At block 203, if there are sufficient resources available, the processor 104 loads part of the training job to a GPU slice 126, 136 or 146, executes the part of the training job as a test run and collects runtime metrics for the current test run. In an embodiment, if the training job is configured for elastic distributed training, the test run is performed in a GPU exclusive mode (i.e., performed without GPU sharing). Examples of such metrics include iteration completion deviation, memory consumption and GPU utilization.

For example, the first training job is loaded in a GPU exclusive mode, an initial run of a selected number of iterations (e.g., 100 iterations) is performed, runtime metrics are collected, and an overlapping schema across the job is calculated. Runtime metrics include, for example, iteration calculation time (TC), memory consumption (MC) and GPU utilization (U).

At block 204, runtime metrics for the current test run, and metrics for any previous test runs, are collected. In addition, runtime metrics are collected for existing training jobs (e.g., training jobs currently being executed or already received). For example, the first training job and existing training jobs are provided as a list of candidates, where each candidate is a different received training job.

For example, each training job is associated with a set of metrics (e.g., TC, MC, U, etc.). Each set of metrics is assembled into a candidate list. The candidate list specifies which jobs can be packed with another job, and increases speed and efficiency by determining whether a job can be packed before the job is actually executed.

In an embodiment, training jobs that are not amenable to packing are excluded from the list. For each job, it is determined whether the memory consumption (MC) associated with the job exceeds the total amount of available memory (Mg) among the GPU slices, or a proportion of the total amount. For example, if MC/Mg is greater than about 90%, the job is excluded from the list. In addition, if U is greater than about 60% of the GPU slices (or any other selected percentage), the corresponding job is excluded from the list. In addition, if a job is not scalable, the job is removed.

As a result, the candidate list represents a set of n training jobs, where n=1–N. Runtime data for a training job n includes a TC metric (TCn), a MC metric (MCn) and a U metric (Un) for each of a selected number of iterations. For example, if the selected number is 100, then data for a training job n includes a set of metrics (TCn,MCn,Un) for each iteration.

At block 205, an efficiency cost model is generated using the collected runtime metrics. The efficiency cost model provides estimates of the cost in resource and time consumption associated with each of a plurality of packing patterns, and facilitates the selection of an optimal packing pattern.

In an embodiment, a packing pair is generated by selecting the iterations from the test run of the first training job and iterations from another job, such that the number of packing pairs is equal to a number of iterations. Additional packing pairs may be generated, where each packing pair includes the first training job and a different other job. For example, a first training job m1 is iterated 100 times as part of a test run. A corresponding number of iterations is selected for a second training job m2. The iterations from m1 and iterations from m2 constitute packing pairs. Each packing pair represents a packing pattern.

The packing pairs are selected such that a given pair does not exceed a selected level of memory consumption and GPU utilization. For example, a sum of the highest MC metric ($MCn_{max}$) and the lowest MC metric ($MCn_{min}$) in a pair should not exceed 90% of the available memory of a GPU slice. In addition, a sum of the highest U metric ($Un_{max}$) and the lowest U metric ($Un_{min}$) in a pair should not exceed 120%.

Another test run is performed for each packing pair and runtime metrics for this test run are collected. The runtime metrics using the packing pattern associated with a packing pair are denoted as (TCp,MCp,Up), where TCp is the TC metric, MCp is the MC metric and Up is the U metric for the packing pair when executed.

An efficiency cost is calculated for each packing pair, which represents the change in cost when a training job is packed with another job in a GPU slice. In an embodiment, the efficiency cost=|TCn−TCp|/TCn. The packing pairs are then sorted by cost.

The cost of each packing pair may be analyzed to determine whether the packing pair is valid, can be packed into one GPU slice, or should be scaled to multiple GPU slices to avoid overconsumption. For example, if the cost of a packing pair representing a packing schema is greater than a selected amount (e.g., 15%), the packing pair is invalid. If the cost is less than the selected amount, and MCp is greater than a selected proportion of available memory Mg (e.g., MCp/Mg>90%), the training job is scaled up according to the same packing schema.

A training job is "scaled up" by increasing the number of GPU slices used by the job. If the training job is configured for elastic distributed training, the training job is changed from model parallelism (where a training model is split into model partitions or layers) to data parallelism (where the training model is replicated with different sets of training data).

A training job may also be "scaled in" by reducing the number of GPU slices used by the job. If the training job is configured for elastic distributed training, the training job is changed from data parallelism to model parallelism.

At block 206, a packing pair and associated scaling is selected and the training jobs are packed according to the packing schema represented by the packing pair. For example, the first training job m1 may be packed with job m2 in a single GPU slice if space permits, or scaled up so that portions of m1 and m2 are each packed into multiple GPU slices.

At block 207, if the cost model does not produce a valid packing pair, it is determined whether the first training job can be split into multiple jobs. If so, at block 208, the job is split and is processed at block 202. If not, no packing is performed (block 209).

If GPU resources are not available for a test run, it is determined whether any existing jobs can be scaled in (block 210). If so, scaling in is performed to make resources available and a test run is performed at block 211.

If sufficient resources are not available and no existing jobs can be scaled in, the training model associated with the training job may be split using model parallelism (block 212). This allows the training job to be fit into available resource fragments (e.g., free portions of GPU slices).

In an embodiment, the training model (i.e., model being training by training jobs) is split into multiple parts, and each part is run in a different GPU slice. At each GPU slice, the model is partitioned (model parallelism) into the smallest possible partition size and a test run is performed. Runtime metrics from this test run are collected (block 205) and a cost model is generated as discussed above. The partition size of the training model is increased as allowed by the cost model to produce a selected partition size. The training model partitions are then packed according to the cost model.

FIGS. 3A-3D and FIGS. 4A-4D depict examples of the method 200 for a received training job m1. In these examples, the method 200 is performed in conjunction with two GPU resources denoted as GPU 0 and GPU 1. The GPU 0 may be the GPU slice 126 and the GPU 1 may be the GPU slice 136, but are not so limited. It is noted that embodiments are not limited to the number of GPU resources or the number of training jobs described in these examples.

Figure 3:
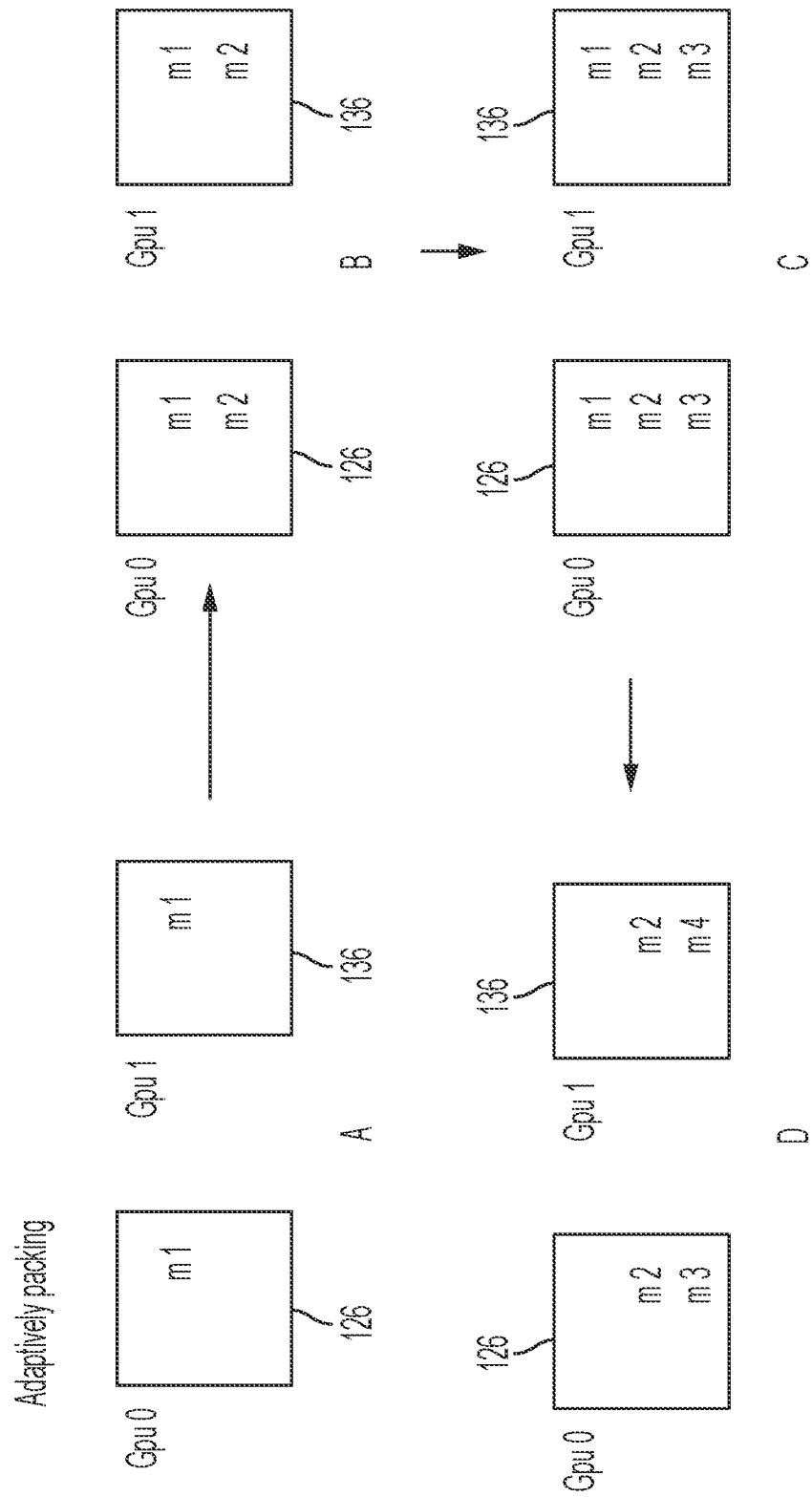
FIG. 3 illustrates an example of loading and executing training jobs using the method of FIG. 2.

FIGS. 3A-3D show an example in which model splitting (i.e., splitting a training model) is not needed. As shown in FIG. 3A, the received training job m1 is too large for one GPU slice, and is thus scaled up as data parallel to run concurrently on GPU 0 and GPU 1. The second training job m2 is received, and is analyzed as discussed above, and a packing pattern is calculated, where the packing pattern specifies that m1 and m2 be scaled to two GPU slices and packed together in GPU 0 and GPU 1. Accordingly, the training job m2 is scaled up and loaded to GPU 0 and GPU 1 (FIG. 3B).

As shown at FIG. 3C, a third training job m3 is received, and there is available memory in the GPUs, but not enough to hold m3 in one GPU. A packing pattern is determined based on available memory in the slices. The third training job m3 is scaled up so that GPU 0 and GPU 1 both hold portions of m1, m2 and m3 according to the packing pattern selected using the method 200. The method 200 allows the training job m3 to be executed (as compared to other methods which would not allow the job m3 to be executed until space is made available).

As shown in FIG. 3D, a fourth training job m4 is received. At this point, the job m1 has completed, thus freeing memory in GPU 0 and GPU 1. The job m3 can be scaled in with data parallelism to GPU 0, and the job m4 can be loaded to GPU 1 without scaling.

Figure 4:
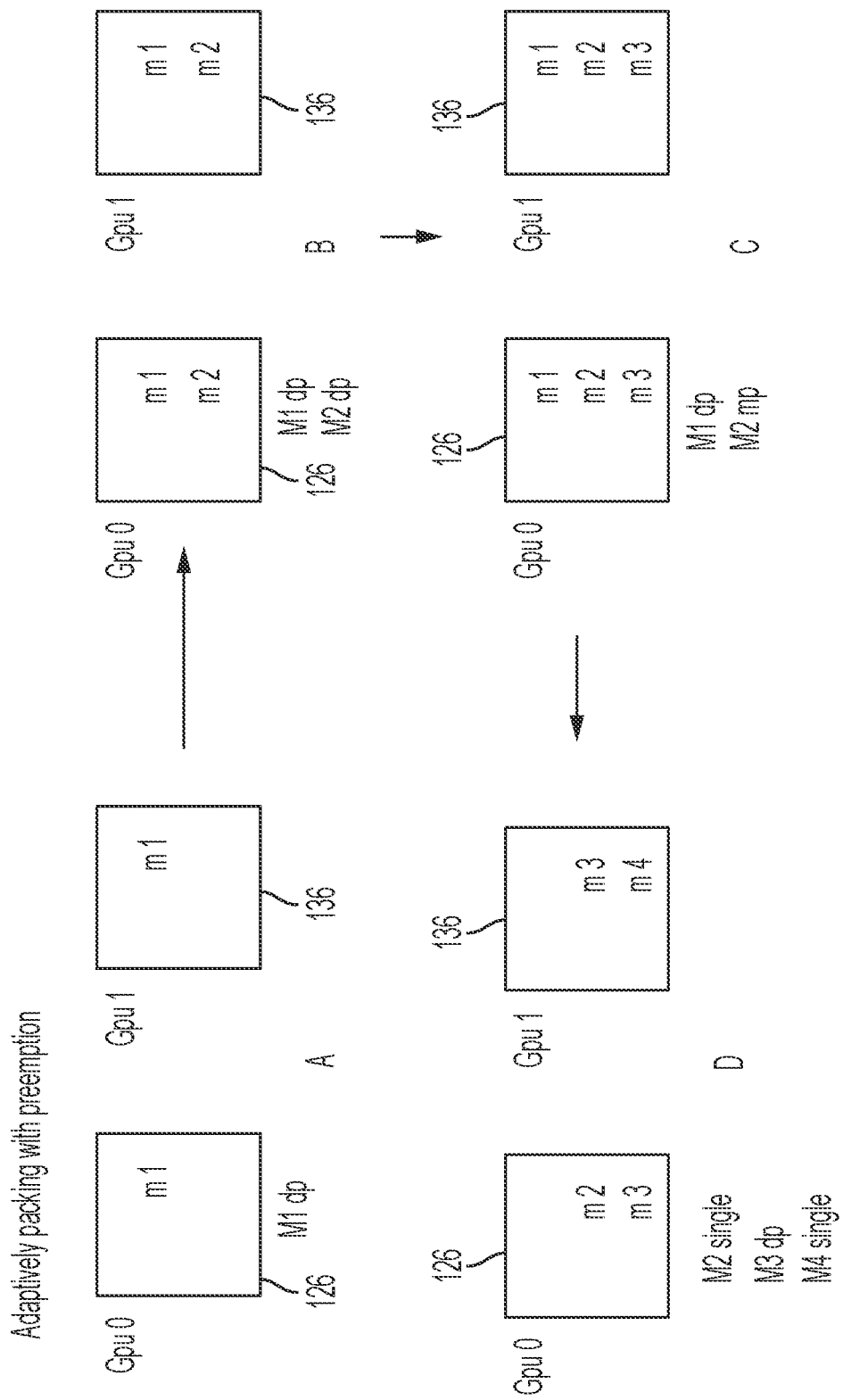
FIG. 4 illustrates an example of loading and executing training jobs using the method of FIG. 2.

FIGS. 4A-4D show an example in which model splitting is used. As shown in FIG. 4A, the first training job m1 scaled up as data parallel to run concurrently on GPU 0 and GPU 1. A second training job m2 is received, and there is available memory in both GPUs. The training job m2 is scaled up as data parallel and packed with the first job m1 into GPU 0 and GPU 1 (FIG. 4B).

As shown at FIG. 4C, the third training job m3 is received, and there is available memory in the GPUs, but not enough to hold the job m3 in one GPU slice. If m3 has a higher priority than the job m2, the lower priority job m2 is split, i.e., changed from data parallel to model parallel. The job m3 is scaled up as data parallel so that GPU 0 and GPU 1 both hold portions of m1, m2 and m3 in a packing pattern selected using the method 200.

As shown in FIG. 4D, the fourth training job m4 is received. At this point, the first job m1 has completed, thus freeing memory in GPU 0 and GPU 1. The job m4 cannot fit (e.g., is not scalable) when the job m2 is split, thus the job m2 is changed to a single job and put into GPU 0. The job m4 is then loaded to GPU 1, without scaling up, with a portion of the job m3.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
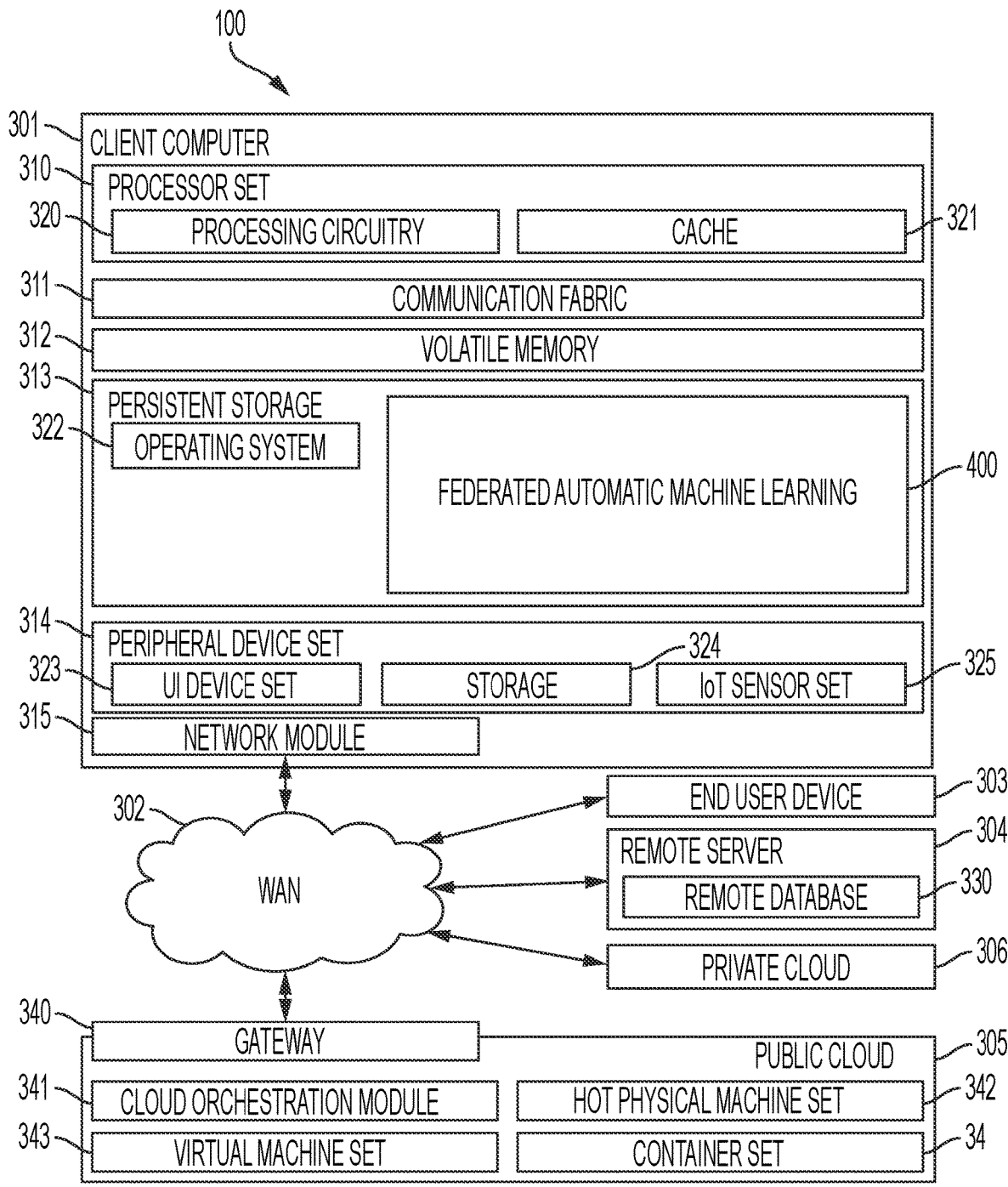
FIG. 5 illustrates a block diagram of a computing environment for implementing the techniques described herein according to examples of the present disclosure.

Referring to FIG. 5, computing environment 300 contains an example of an environment for the execution of at least some of the computer code involved in performing the inventive methods, such as training job execution and GPU resource allocation code 400. In addition to block 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 400, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 5. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 400 in persistent storage 313.

COMMUNICATION FABRIC 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in block 400 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

In other examples, the present disclosure may be implemented on cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
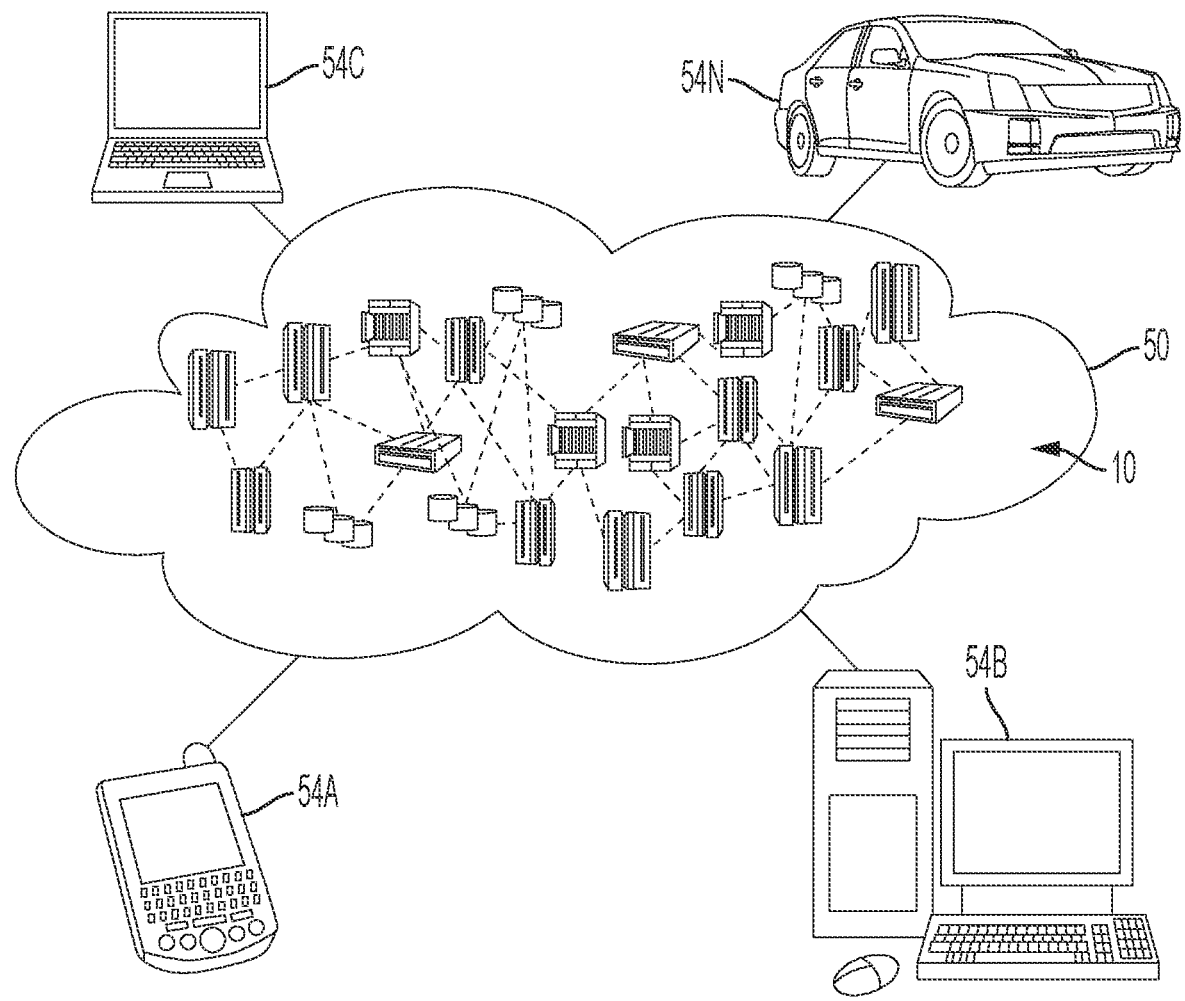
FIG. 6 illustrates a cloud computing environment according to examples of the present disclosure.

Referring now to FIG. 6, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
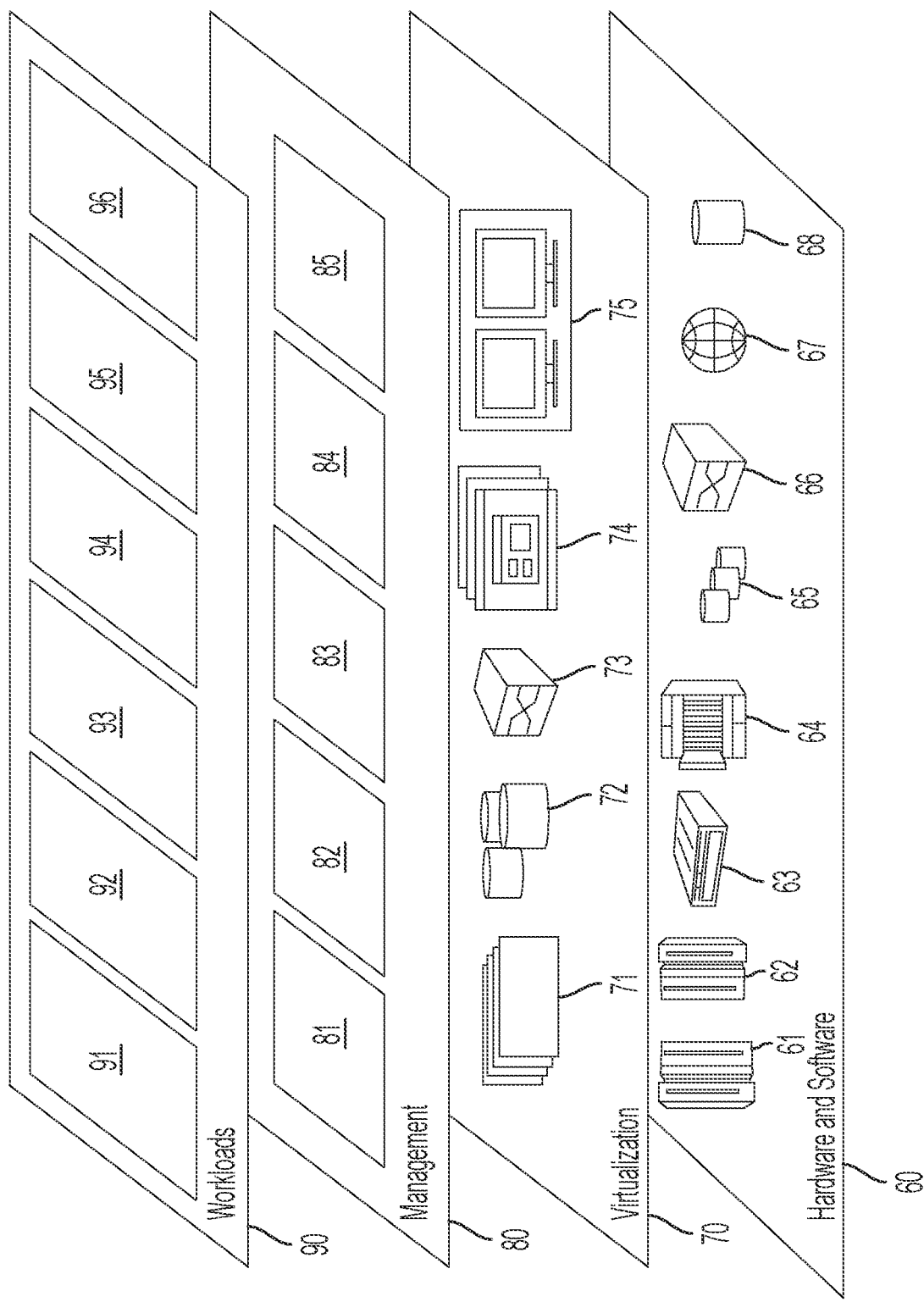
FIG. 7 illustrates abstraction model layers according to examples of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GPU resource allocation 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method for training a machine learning model, the method comprising:
   receiving a first training job at a processing device of a computer system having a plurality of graphics processing unit (GPU) resources, the first training job being part of a set of training jobs;
   determining an amount of available memory in each GPU resource of the plurality of GPU resources; and
   loading the training job into one or more GPU resources with at least one second training job, wherein the loading includes:
      determining a cost model indicating an efficiency cost of each of a plurality of packing patterns, and packing the first training job and the second training job into the one or more GPU resources according to a packing pattern associated with a lowest efficiency cost.

2. The method of claim 1, wherein determining the cost model includes performing a test run for the first training job, the test run including a selected number of iterations, and collecting runtime metrics for the first training job.

3. The method of claim 2, wherein determining the cost model includes generating a packing pair for each iteration, each packing pair including an iteration for the first training job and an iteration for the second training job.

4. The method of claim 3, wherein determining the cost model includes calculating the efficiency cost for each packing pair, and selecting the packing pattern associated with a packing pair having the lowest efficiency cost.

5. The method of claim 2, further comprising scaling in an existing job to reduce a number of GPU resources executing the existing job, to provide sufficient memory to perform the test run.

6. The method of claim 1, wherein determining the cost model includes splitting a training model associated with the first training job.

7. The method of claim 1, wherein the loading includes adaptively packing the first training job into the one or more GPU resources based on the packing pattern associated with the lowest efficiency cost, wherein adaptively packing includes scaling up the first training job based on there being insufficient memory to hold the first training job and the second training job in a single GPU resource.

8. The method of claim 1, wherein the first training job is configured for elastic distributed training.

9. A system for training a machine learning model, the system comprising:
a processor in communication with a computer system having a plurality of graphics processing unit (GPU) resources, the processor configured to perform:
receiving a first training job, the first training job being part of a set of training jobs;
determining an amount of available memory in each GPU resource of the plurality of GPU resources; and
loading the training job into one or more GPU resources with at least one second training job, wherein the loading includes:
determining a cost model indicating an efficiency cost of each of a plurality of packing patterns, and packing the first training job and the second training job into the one or more GPU resources according to a packing pattern associated with a lowest efficiency cost.

10. The system of claim 9, wherein determining the cost model includes performing a test run for the first training job, the test run including a selected number of iterations, and collecting runtime metrics for the first training job.

11. The system of claim 10, wherein determining the cost model includes generating a packing pair for each iteration, each packing pair including an iteration for the first training job and an iteration for the second training job.

12. The system of claim 11, wherein determining the cost model includes calculating the efficiency cost for each packing pair, and selecting the packing pattern associated with a packing pair having the lowest efficiency cost.

13. The system of claim 10, wherein the processor is further configured to perform scaling in an existing job to reduce a number of GPU resources executing the existing job, to provide sufficient memory to perform the test run.

14. The system of claim 9, wherein the loading includes adaptively packing the first training job into the one or more GPU resources based on the packing pattern associated with the lowest efficiency cost, wherein adaptively packing includes scaling up the first training job based on there being insufficient memory to hold the first training job and the second training job in a single GPU resource.

15. A computer program product for training a machine learning model, the computer program product comprising: a non-transitory storage medium readable by a processing circuit and storing instructions for execution by the processing circuit for performing a method comprising:
receiving a first training job at a processing device of a computer system having a plurality of graphics processing unit (GPU) resources, the first training job being part of a set of training jobs;
determining an amount of available memory in each GPU resource of the plurality of GPU resources; and
loading the training job into one or more GPU resources with at least one second training job, wherein the loading includes:
determining a cost model indicating an efficiency cost of each of a plurality of packing patterns, and packing the first training job and the second training job into the one or more GPU resources according to a packing pattern associated with a lowest efficiency cost.

16. The computer program product of claim 15, wherein determining the cost model includes performing a test run for the first training job, the test run including a selected number of iterations, and collecting runtime metrics for the first training job.

17. The computer program product of claim 16, wherein determining the cost model includes generating a packing pair for each iteration, each packing pair including an iteration for the first training job and an iteration for the second training job.

18. The computer program product of claim 17, wherein determining the cost model includes calculating the efficiency cost for each packing pair, and selecting the packing pattern associated with a packing pair having the lowest efficiency cost.

19. The computer program product of claim 16, wherein the method further includes scaling in an existing job to reduce a number of GPU resources executing the existing job, to provide sufficient memory to perform the test run.

20. The computer program product of claim 15, wherein the loading includes adaptively packing the first training job into the one or more GPU resources based on the packing pattern associated with the lowest efficiency cost, wherein adaptively packing includes scaling up the first training job based on there being insufficient memory to hold the first training job and the second training job in a single GPU resource.

* * * * *